United States Patent [19]

Behrens

[11] Patent Number: 4,998,346
[45] Date of Patent: Mar. 12, 1991

[54] METHOD OF MAKING A UNITARY, AXIALLY SELF-LOCATING NEEDLE BEARING

[75] Inventor: Mark B. Behrens, Charlotte, N.C.

[73] Assignee: INA Bearing Company, Fort Mill, S.C.

[21] Appl. No.: 499,069

[22] Filed: Mar. 26, 1990

Related U.S. Application Data

[62] Division of Ser. No. 336,790, Apr. 12, 1989, Pat. No. 4,955,732.

[51] Int. Cl.$^5$ .............................................. B21D 53/12
[52] U.S. Cl. ......................... 29/898.061; 29/898.065; 29/898.067
[58] Field of Search ............ 29/898, 898.061, 898.064, 29/898.065, 898.067

[56] References Cited

U.S. PATENT DOCUMENTS

| | | |
|---|---|---|
| 2,074,182 | 3/1937 | Heim . |
| 2,488,848 | 11/1949 | Carullo et al. . |
| 2,699,366 | 1/1955 | Heinrich . |
| 2,866,672 | 12/1958 | Black . |
| 3,230,022 | 1/1966 | Znamirowski . |
| 3,248,155 | 4/1966 | Schaeffler . |
| 3,253,869 | 5/1966 | Smith . |
| 3,328,097 | 6/1967 | Wilson . |
| 3,479,100 | 11/1969 | Pitner ................................. 384/484 |
| 4,222,620 | 4/1980 | Mirring . |
| 4,435,024 | 3/1984 | Tagawa et al. . |
| 4,565,458 | 1/1986 | Achee et al. . |
| 4,657,414 | 4/1987 | Stella ................................... 384/564 |
| 4,699,529 | 10/1987 | Scholl et al. ........................ 384/560 |

FOREIGN PATENT DOCUMENTS

| | | |
|---|---|---|
| 2056710 | 5/1971 | France . |
| 2349061 | 11/1977 | France . |
| 2528922 | 12/1983 | France . |

*Primary Examiner*—Timothy V. Eley
*Attorney, Agent, or Firm*—Wigman & Cohen

[57] ABSTRACT

A unitary, axially self-locating needle bearing which may be of the drawn shell type has an inner race having a crimped flange projecting radially outwardly from the inner race, an outer race having a flange projecting radially inwardly at either end of the outer race, and a plurality of needle rollers held in a cage contained between the drawn inner race and the drawn outer race. The flange on the inner race axially locates the inner race with respect to the outer race. The crimp forms a radially outwardly projecting flange on the inner race positioned between one end of the caged needle rollers and one of the inwardly projecting flanges of the outer race. The other inwardly projecting flange of the outer race is positioned at the other end of the caged needle rollers.

2 Claims, 2 Drawing Sheets

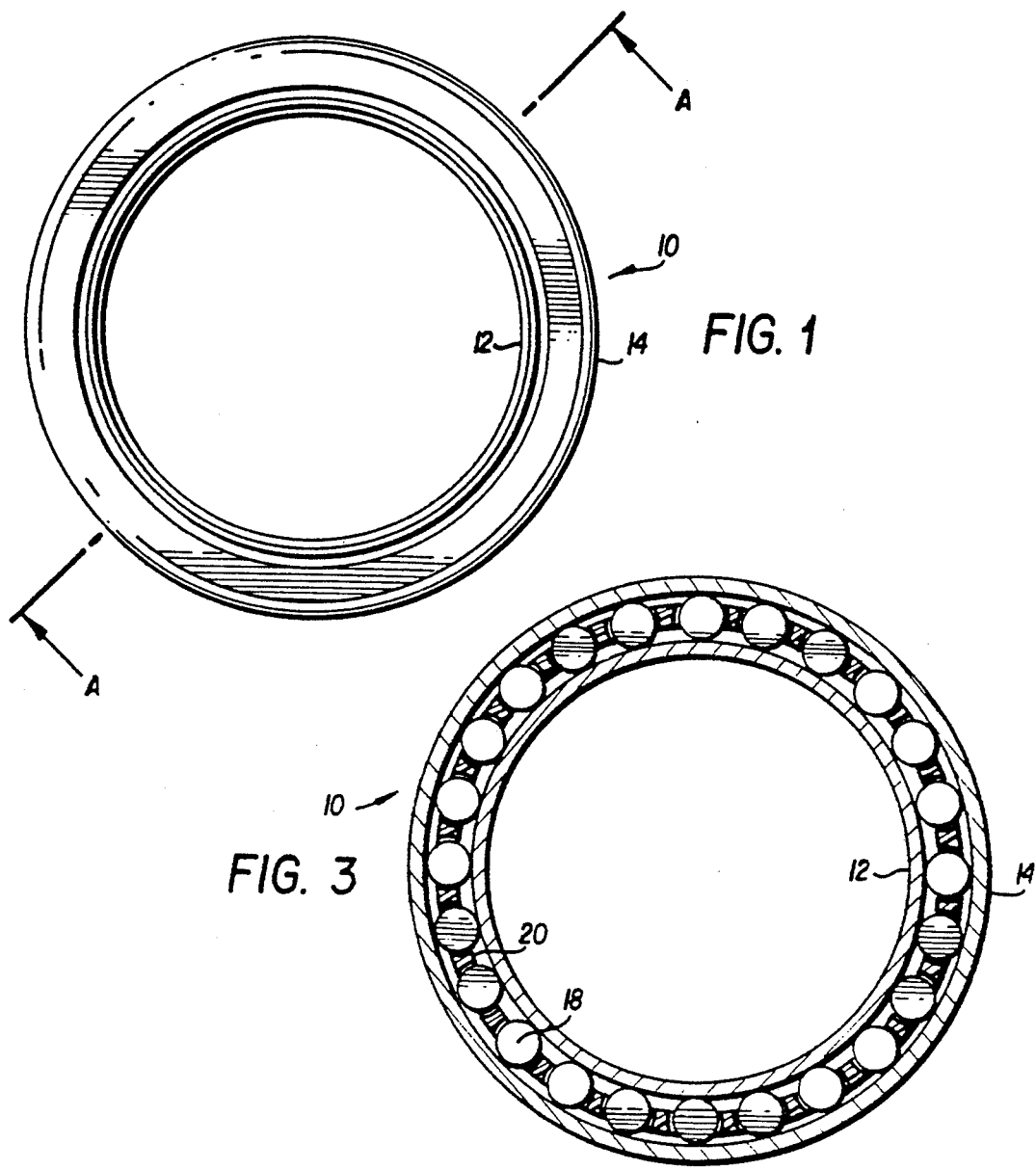
FIG. 1
FIG. 3
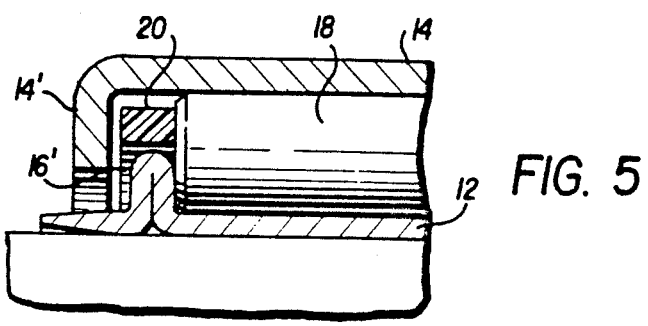
FIG. 5

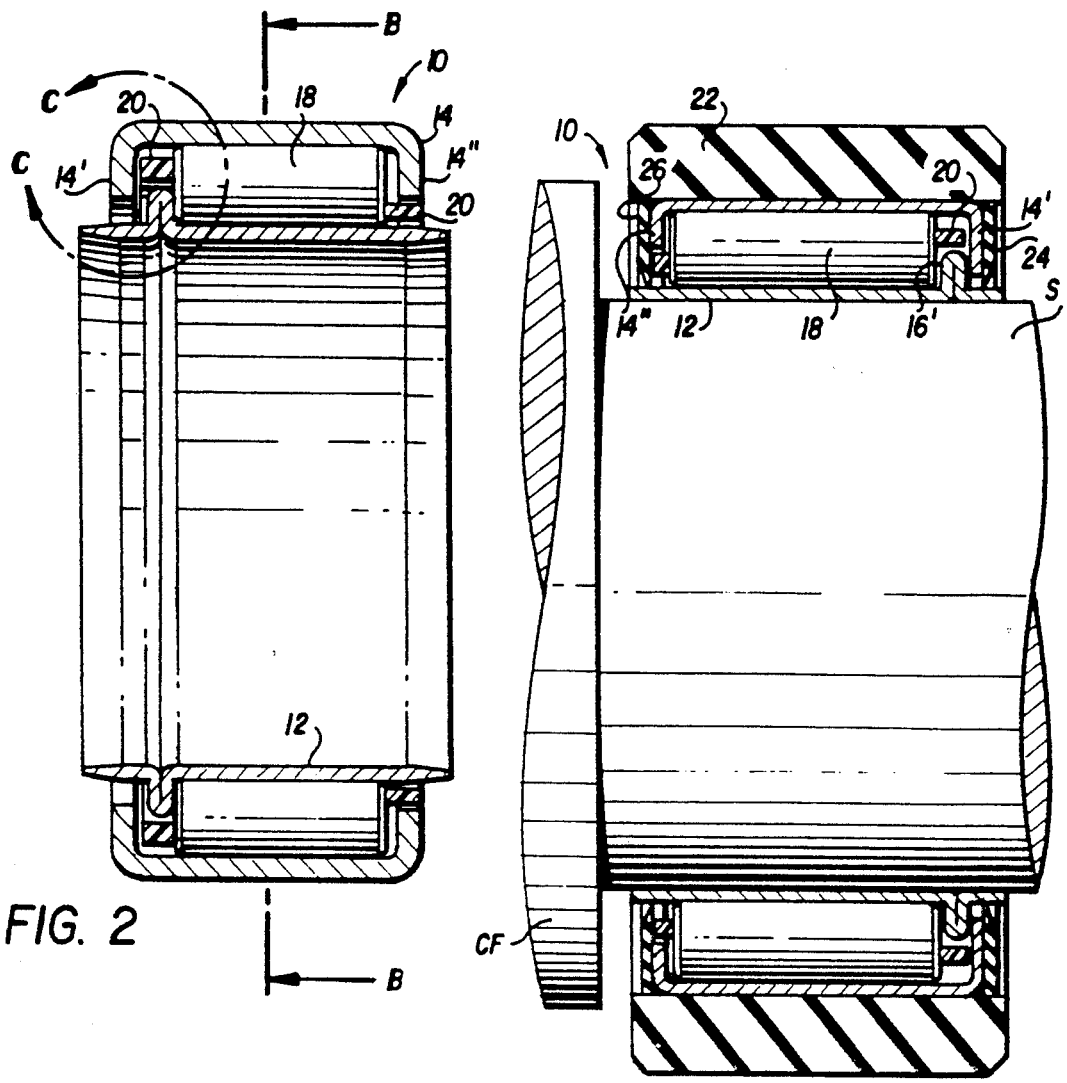
FIG. 2
FIG. 6
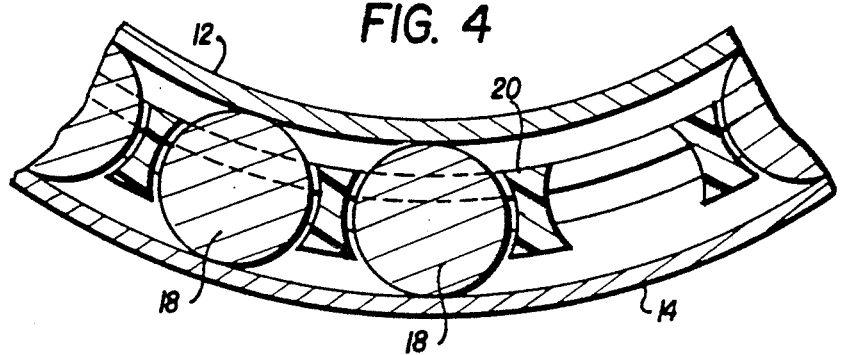
FIG. 4

METHOD OF MAKING A UNITARY, AXIALLY SELF-LOCATING NEEDLE BEARING

This is a divisional of co-pending application Ser. No. 07/336,790 filed on Apr. 12, 1989 now U.S. Pat. No. 4,955,732.

BACKGROUND OF THE INVENTION

1. Field of the Invention

The present invention relates generally to needle bearings, and more particularly to a self-contained drawn shell needle bearing having means for axially locating the bearing housing with respect to a shaft.

2. Description of the Prior Art

Prior art needle bearings are typically manufactured and sold without inner races. U.S. Pat. Nos. 4,565,458, 3,257,869, 3,248,155 and 2,488,848 are exemplary of this type construction. The needle and cage assembly is retained in an outer race which may be inserted on a hardened shaft or, in applications where an annealed shaft is used, on a separate inner race which is press fit on the shaft.

While needle bearings are designed to carry radial loads, separate means usually must be provided to carry axial loads and to axially position the needle bearing with respect to the shaft. This is typically accomplished in the prior art by providing a ball or roller bearing—which, because of its relatively deep grooves, can take some degree of axial loading—on the end of the shaft opposite from the needle bearing, or a snap ring mounted in a groove on the shaft which abuts against a shoulder on the shaft housing.

Certain kinds of unitary, self-locating needle bearings are, however, known in the prior art which do not require auxiliary means for axial positioning with respect to the shaft. With respect to U.S. Pat. No. 3,328,097 to Wilson, for example, discloses a bearing construction having a "double shouldered" inner and outer race However, because the races are machined from relatively heavy gauge stock, he needles must be inserted by eccentric alignment of the races, as seen in FIG. 4. This is similar to the manner in which ball bearings are assembled. It should be apparent, of course, that such a method of assembly does not permit the use of a full complement of rollers.

French Patents Nos. 2,056,710, 2,349,061 and 2,528,922 disclose various types of self-contained needle bearings made from relatively thin sheet stock. Consequently, the bearings may be manufactured with a full complement of needles by flanging the outer race over the needles during assembly. However, each of those bearings includes separate retaining elements, such as washers or rings, for locating the bearing with respect to the shaft, and are thus complex and expensive to manufacture and install.

Drawn shell needle bearings are made from strip steel stock, from which disks are blanked. The disk is progressively drawn into a cup shape by means of a series of punches and dies, and a small circle of material is removed from the bottom of the cup to form a shell for an open-ended bearing. This shell is then heat treated, the needle and cage assembly are inserted, and a finish flange is rolled into the shell to retain the cage and roller assembly.

In application, drawn shell needle bearings are pressed into their housings, with the shaft operating in a small clearance condition. Distinct from true precision bearings, there is no machining of metal on the raceway (the shell). Such bearings are relatively low cost items, giving medium precision with high radial load capacity, despite very small radial section height.

As discussed above, such bearings can bear radial load only. The shaft is free to move axially through the bearing. Generally, in order to axially locate or retain the shaft with respect to the bearing housing, a thrust bearing configuration, an angular contact ball bearing configuration, or a ball bearing must be incorporated.

SUMMARY AND OBJECTS OF THE INVENTION

In view of the foregoing limitations and shortcomings of the prior art devices, as well as other disadvantages not specifically mentioned above, it is a primary objective of this invention to provide a unitary, self-locating needle bearing that is inexpensive and easy to manufacture and install (by press fit) on a shaft.

Another object of this invention is to provide a needle bearing having inner and outer races that may be accurately located with respect to a shaft without the use of thrust bearings or other auxiliary means for providing axial location.

A further object of this invention is to provide a unitary needle bearing with inner and outer races constructed from drawn shell sheet metal whereby a full complement of rollers may be utilized, if desired.

Yet another object of this invention is to provide a unitary bearing with an integral case-hardened inner race which does not require a hardened shaft to achieve maximum durability, thereby eliminating the need to treat the shaft.

A further object of the invention is to provide a method of making a bearing of the aforementioned type.

An additional object of the present invention is to provide an improved sealing means for the improved bearing.

Briefly described, the aforementioned objects are accomplished according to the invention by providing a unitary, axially locating needle bearing which includes an inner race having a flange projecting radially outwardly from the inner race. The bearing further includes an outer race having a flange projecting radially inwardly at either end of the outer race. A plurality of needle rollers are held in a cage contained between the inner and outer races The inner and outer races are axially located with respect to each other by positioning the radially outwardly projecting flange of the inner race between one end of the roller set and one of the inwardly projecting flanges of the outer race, with the other inwardly projecting flange of the outer race positioned at the other end of the roller set. Preferably, the outwardly projecting flange of the inner race comprises a crimped portion of the material from which the inner race is constructed. In the preferred embodiment, the bearing is of the drawn shell type.

With the foregoing and other objects advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a front view of a bearing made in accordance with the invention;

FIG. 2 is a sectional view of the bearing illustrated in FIG. 1, taken along line A—A of FIG. 1;

FIG. 3 is a sectional view of the same bearing taken along line B—B of FIG. 2;

FIG. 4 is an enlarged view of a portion of the view according to FIG. 3, illustrating in detail the support of the rollers within the cage, with one roller removed for purposes of illustration;

FIG. 5 is an enlarged view of a portion of the bearing taken according to Circle "C" of FIG. 2; and FIG. 6 is an alternate embodiment of a bearing made in accordance with the invention, the bearing being provided with seals and installed on a shaft.

DETAILED DESCRIPTION OF A PREFERRED EMBODIMENT

Referring now in detail to the drawings wherein like parts are designated by like reference numerals throughout, there is illustrated in FIG. 1 a bearing in accordance with the invention, which is designated generally by reference numeral 10.

Referring now to FIGS. 2, 3, and 4 in connection with FIG. 1, bearing 10 includes a drawn inner race 12, a drawn outer race 14, and needle rollers 18 contained by cage 20. Outer race 14 has a radially inwardly projecting first flange 14' and a radially inwardly projecting second flange 14". Cage 20 may be of any suitable design of needle bearing cage known in the art.

Referring now to FIG. 5 in conjunction with FIGS. 2 and 3, it is seen that inner race 12 includes a radially outwardly projecting flange 16'. Flange 16' is formed in the preferred embodiment by crimping a conventional drawn inner race to form a doubled-over thickness of sheet metal in the desired location. As is apparent from the drawings, flange 16' is positioned between one end of roller set 18 and first inwardly projecting flange 14' of drawn outer race 14. Furthermore, second inwardly projecting flange 14" of drawn outer race 14 is positioned at the opposite end of roller set 18.

Referring now to FIG. 6, a practical application of the bearing of the invention in place on a shaft S is illustrated. In the particularly illustrated embodiment, shaft S is the shaft of a cam follower CF. As in the embodiment illustrated in FIGS. 1-5, bearing 10 includes an inner race 12 having outwardly projecting flange 16', an outer race 14 having inwardly projecting flanges 14' and 14", a plurality of needles 18, and a cage 20. On the outer surface of outer race 14 is mounted a rotatable annular ring 22. Ring 22 may be any of a number of machine elements, such as a gear, a roller, a pulley, or a sprocket and may be used for such purposes as a cam follower, belt tensioner, idler wheel, or idler gear.

Mounted at the opposing ends of ring 22 are a first radial seal 24 and a second radial seal 26. The seals 24, 26 extend in sealing engagement with the outer surface of drawn inner race 12. Contact at the drawn inner ring is by seals of identical dimension, a particularly advantageous aspect of this embodiment of the invention.

In this regard it should be noted that seals, like bearings themselves, require smooth and hard running surfaces for effective sealing and long life. According to the illustrated embodiment the contact lips of the seals run on the smooth, clean surface of the drawn inner ring, reducing the overall cost of the machine in which the bearing is assembled, because shaft preparations, such as hardening and grinding for smoothness, are not required.

It is also possible to include seals or shields assembled into additional seal flanges on the drawn outer race, for a bearing that is sealed or shielded without an outer annular ring.

It should be noted that a particular advantage of the illustrated embodiment lies in the fact that an optional shoulder with a retaining snap ring or retaining cap, or two snap rings, with or without a press fit may be used to axially retain the inner ring. It should also be noted that, while location of the bearing on the shaft is, typically by press fit, specifics of the application will determine the necessity of press fits at housing, shaft, or both.

Further, it should be noted that while in the preferred embodiment a drawn shell bearing has been described and illustrated it is possible to construct the bearing in accordance with the invention in any other appropriate fashion, such as by machining the inner and outer races Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A method of making a drawn shell, axially located needle bearing comprising:
    deep drawing an outer race;
    deep drawing an inner race;
    providing a plurality of needle rollers;
    crimping a portion of one of said races to provide a radially projecting annular flange thereon;
    providing a radially projecting annular flange on the other one of said races;
    assembling said outer race, said inner race and said needle rollers with said annular flange on the other one of said races and adjacent ends of said needle rollers, whereby said inner and outer races are axially located with respect to one another.

2. A method of making a unitary, axially self-locating needle bearing comprising:
    providing an outer race;
    providing an inner race;
    providing a plurality of needle rollers;
    crimping a portion of one of said races to provide a radially projecting annular flange thereon;
    providing a radially projecting annular flange on the other one of said races;
    assembling said outer race, said inner race and said needle rollers with said annular flange on said one of said races positioned between the annular flange on the other one of said races and adjacent ends of said needle rollers, whereby said inner and outer races are axially located with respect to one another.

* * * * *